J. HARVEY.
Dropping Attachment for Corn-Planters.
No. 197,125. Patented Nov. 13, 1877.
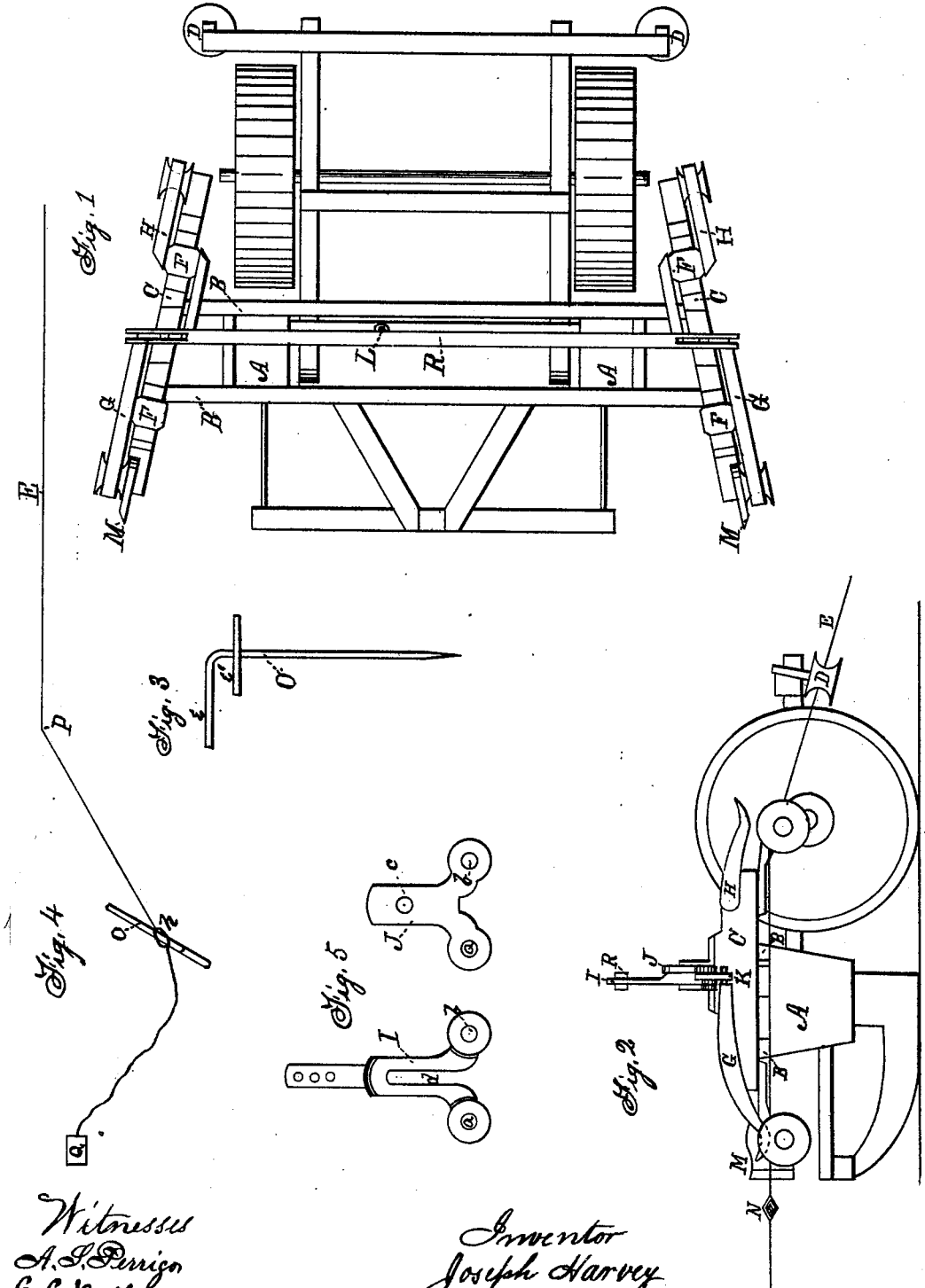
Witnesses
A. J. Perrigo
E. E. Butler
Inventor
Joseph Harvey
By Allen and Perrigo
His Attorneys.

UNITED STATES PATENT OFFICE.

JOSEPH HARVEY, OF ALEDO, ILLINOIS.

IMPROVEMENT IN DROPPING ATTACHMENTS FOR CORN-PLANTERS.

Specification forming part of Letters Patent No. 197,125, dated November 13, 1877; application filed October 15, 1877.

*To all whom it may concern:*

Be it known that I, JOSEPH HARVEY, of Aledo, State of Illinois, have invented an Improved Dropping Attachment for Corn-Planters, of which the following is a specification:

The object of my invention is to provide a mechanical means of actuating the seed-bar of the ordinary corn-planter.

Figure 1 is a top or plan view of planter with dropper attached. Fig. 2 is a side elevation of same; and Figs. 3, 4, and 5, are details of dropper attachment.

Upon the seed-boxes A A of the planter are placed the timbers B B, and upon the outer ends of these are placed the timbers C C of the attachment. These timbers should be placed with their rear ends approaching each other, and aligning with the sheaves D D, as shown in Fig. 1; the object of which is to leave the wire E on the smooth track made by the wheel of the planter, so that the wire can be more readily taken up by the attachment on the return trip of the planter than if it lay on the rough ground, where it is liable to be caught by the clods of earth. Upon the upper sides of the timbers C C are the boxes F, in which are pivoted the levers G and H, which are connected to the two parts of the oscillating arms I and J by the links K, and converting the vertical reciprocating motion of the levers to a transverse horizontal reciprocating motion of the oscillating arms, which, by means of the bar R and lever L, is communicated to the seed-bar, which operates in the usual manner. Under the outer ends of the levers G and H are placed sheave-rollers to facilitate the passage of the wire, and at the sides of the forward rollers are the guards M M, to keep the wire on the rollers. The wire is provided with cylinders of wood or iron N, tapered at either end, and secured on the wire at a distance equal to twice the distance between the centers of the sheave-rollers.

In operation the wire is secured in the rear of the planter to the stake O, (to be hereinafter described,) and laid in the grooves of the rollers and under the outer ends of the levers. The planter being then advanced, as each cylinder passing over either roller raises the outer end of its lever, and, by the connections aforementioned, depresses the outer end of the other lever of the pair, the same motion of the seed-bar is produced as though operated by hand.

The stake O should be made of round iron in form, as shown in Fig. 3, which should be driven into the ground so that the horizontal portions $e$ $e'$ will be at an angle of about sixty degrees to the direction traversed by the planter. The ring $h$ on the wire in rear of the planter will then lie on the lower horizontal portion $E'$ of the stake, and will be properly secured, and on the return of the planter to near its starting-point, will, when the forward roller reaches about the point marked P, Fig. 4, (which is a plan view,) assume a vertical position, and slip from the upper horizontal portion $e'$ of the stake. The weight Q is attached to the wire to prevent too great a rebound and consequent derangement when the strained wire is thus suddenly loosened from the upper horizontal portion of the stake.

Fig. 5 is an elevation, showing the inner sides of the oscillating arms, $b$ $b$ being the pivoting-pins, to which the links are attached; $a$ $a$, the holes by which the oscillating arms are pivoted to the rigid parts, which are secured to the timber C C; and $c$, the pin playing in the slot $d$, to communicate the motion of the one part to the other. The holes in the upper part of the oscillating arm I are to connect it to the bar R, which bar may be raised or lowered to move the seed-bar the proper distance.

I do not desire to confine myself to the wire with the cylinders N, as a knotted cord or rope could be substituted therefor, if preferred.

I claim as my invention—

1. In a dropping attachment for corn-planters, the combination, with the stake O, of the wire or cord E, provided with the weight Q, substantially as and for the purpose specified.

2. In a dropping attachment for corn-planters, the combination of the wire or cord E, provided with the ring $h$, and the stake O, substantially as and for the purpose specified.

3. The stake O, provided with the horizontal portions $e$ and $e'$, substantially as and for the purpose herein shown and described.

4. The combination, with a corn-planter, of the sheave D, frame C, with its sheave-rollers, and the cord or wire E, arranged relatively to each other, as herein shown and described, whereby the cord or wire is left on the smooth track made by the wheel of the planter, as specified.

5. The combination, with the wire or cord E, having cylinders N, or their equivalents, and the frame C, provided with the sheave-rollers, of the levers G H, links K, oscillating arms I J, seed-bar, and intermediate mechanism, substantially as and for the purpose specified.

6. The combination of the wire or cord E, frame C, with its sheave-rollers and guard M, sheave D, levers G H, links K, oscillating arms I J, cross-bar R, lever L, and seed-bar, substantially as and for the purpose herein shown and described.

JOSEPH HARVEY.

Witnesses:
 C. R. WOOD, Jr.,
 E. C. HUMPHREY.